United States Patent [19]
Carter, Jr.

[11] Patent Number: 5,074,515
[45] Date of Patent: Dec. 24, 1991

[54] HANGER BAR FOR CEILING FIXTURES

[75] Inventor: Norwood S. Carter, Jr., Harrells, N.C.

[73] Assignee: Fasco Industries, Inc., Lake Forest, Ill.

[21] Appl. No.: 525,071

[22] Filed: May 18, 1990

[51] Int. Cl.⁵ .............................................. F16M 13/00
[52] U.S. Cl. ....................................... 248/546; 248/57; 248/71; 248/343; 248/906
[58] Field of Search .............. 248/343, 57, 906, 354.6, 248/546, 71

[56] References Cited
U.S. PATENT DOCUMENTS

| | | | |
|---|---|---|---|
| 1,446,382 | 2/1923 | Dwight | 248/546 X |
| 1,927,515 | 9/1933 | Eastman | 248/343 |
| 2,350,113 | 5/1944 | Hurley | 248/354.6 |
| 2,455,448 | 12/1948 | Swalinkavich et al. | 248/354.6 |
| 2,770,436 | 11/1956 | Linhardt, Jr. | 248/57 |
| 3,892,378 | 7/1975 | Lane | 248/57 X |

FOREIGN PATENT DOCUMENTS 43302 2/1933 Switzerland .................... 248/354.6

Primary Examiner—David L. Talbott
Attorney, Agent, or Firm—Shlesinger, Fitzsimmons & Shlesinger

[57] ABSTRACT

The bar includes two, elongate, rigid members connected together at one end of the bar by a pin and slot connection, and at the opposite end of the bar by a pivotal link, which supports one member for pivotal and translational movement relative to the other member between a retracted position in which the members and link are inclined to each other, and an extended position in which the two members and link are disposed in overlapping, parallel relation. At opposite ends of the bar the two members have pointed ends which are advanced one relative to the other to become imbedded in the confronting surfaces of a pair of adjacent ceiling joists, when the link is swung in a direction to advance the one member relative to the other. A bolt which extends between the two members can be employed to draw the one member into its advanced position relative to the other.

11 Claims, 2 Drawing Sheets

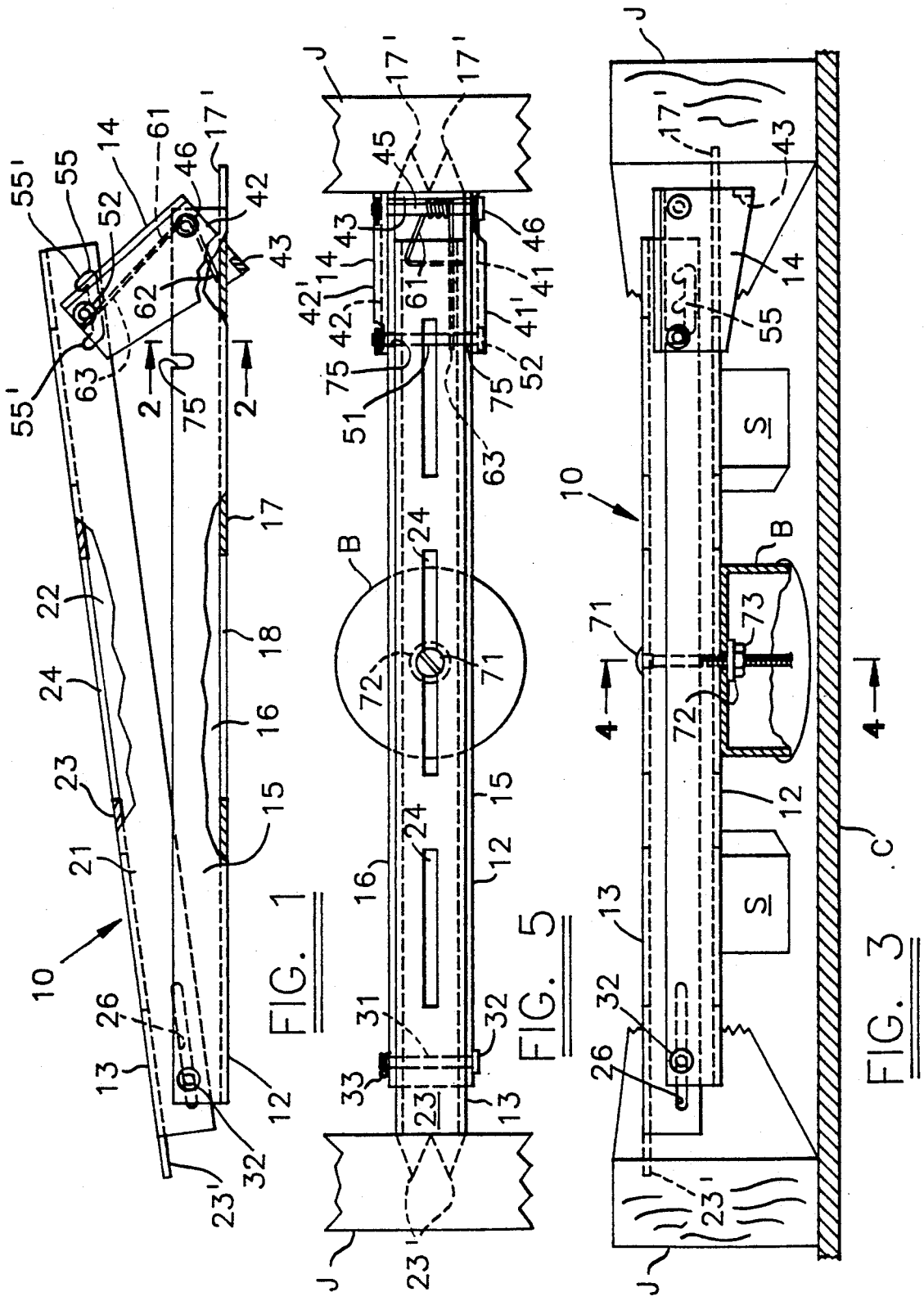

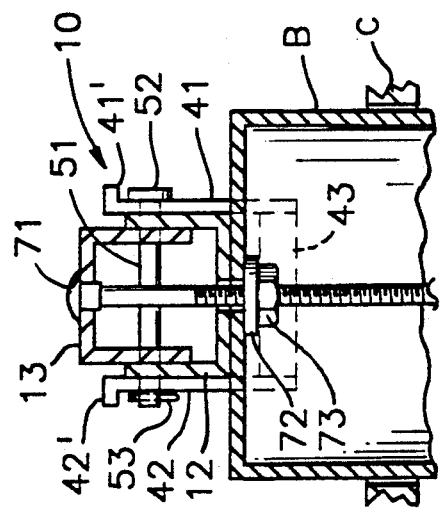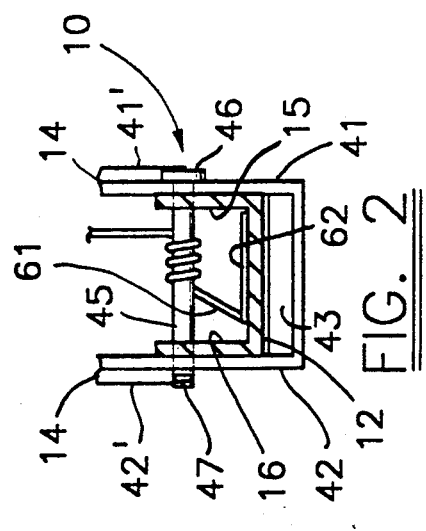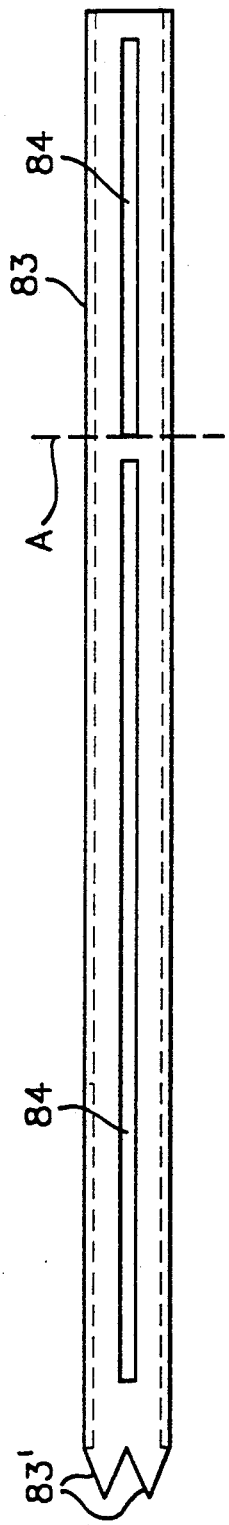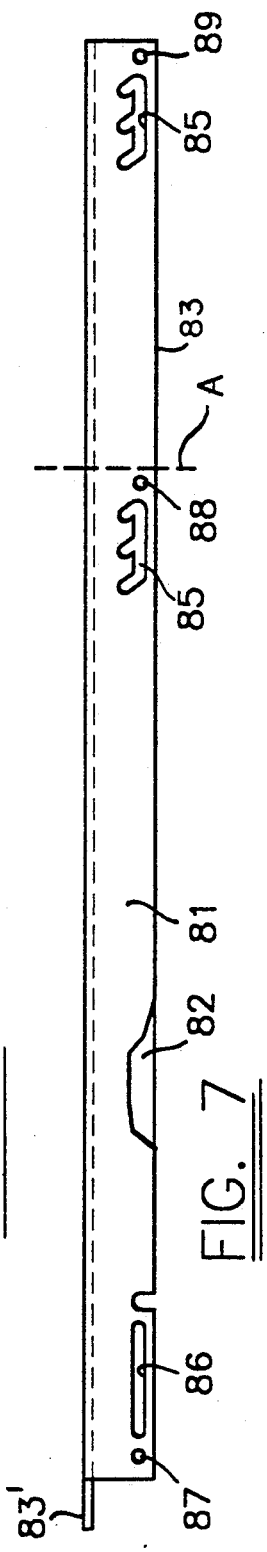

HANGER BAR FOR CEILING FIXTURES

BACKGROUND OF THE INVENTION

This invention relates to hanger bars for supporting fixtures from the ceiling of a room, or the like, and more particularly to an improved such hanger bar, which is adapted to be adjustably and securely mounted between ceiling joists to provide a sturdier support for ceiling fixtures, such as lamps, ceiling fans, and the like.

It has long been customary to employ so-called hanger bars for supporting rather heavy electrical fixtures from the ceiling of a room or the like. Most such fixtures, particularly if they happen to be rather heavy, cannot be be attached directly to the ceiling of a room, because most ceilings simply are not sturdy enough to support a heavy load. If, of course, it is desired to position a ceiling fixture at a particular point in a room in which the fixture would register vertically with an existing ceiling joist, then the fixture could be fastened directly to the underside of the joist, thus obviating the need for any additional supporting fixture. Unfortunately, however, more often than not it becomes necessary or desirable to mount a ceiling fixture at some point in a room in which the fixture will not register with a ceiling joist. The solution, therefore, has been to employ an adjustable or telescopic hanger bar, which is mounted to extend transversely in the space between a pair of adjacent ceiling joists.

By way of example, prior art hanger bars of the telescopic variety have been disclosed in U.S. Pat. Nos. 4,391,428, 3,518,421 and 3,425,655. Typically these bars comprise two, rigid, telescopically connected members having at opposite ends thereof sharp points or gripping surfaces. In use, the telescoped bar is inserted into the space between a pair of adjacent ceiling joists, and is then expanded to cause opposite ends thereof to be driven or otherwise secured to the confronting faces of the spaced ceiling joists, thus providing a stationary support that extends transversely, and generally horizontally, between the two joists. Thereafter the desired ceiling fixture is attached at its upper end through an opening in the ceiling to the hanger bar to be supported from the underside thereof.

One of the problems with prior such hanger bars has been the difficulty encountered in attempting to fix opposite ends of the bar to the confronting surfaces of a pair of spaced joists. It is essential, of course, that opposite ends of the bar be securely attached to the joists so that the bar will remain stationary after the ceiling fixture has been attached thereto. In the case of the above-described telescopic type hanger bar devices, it has been customary to employ a hammer or compression tool for driving the two telescopically connected parts away from each other in order to imbed or otherwise secure opposite ends of the bar to the adjacent joists.

U.S. Pat. Nos. 1,927,515 and 2,770,436, on the other hand, have disclosed hanger bars of the type comprising two, rigid members which are pivotally connected together, rather than being telescopically connected together. With these prior art devices the pivotally connected members are inserted in the space between a pair of adjacent joists while the two members are disposed in so-called collapsed positions in which they are inclined to each other. Then, in order to secure opposite ends of the bar to the two joists, the pivot point of the two members is shifted so that the members are swung almost into linear alignment with each other, thereby forcing opposite ends of the hanger bar away from each other, and in practice imbedding or otherwise securing opposite ends of the bar in the two joists.

While the above-described prior art hanger bars have been suitable for certain purposes, they each have certain disadvantages. In the case of the telescopic variety, the tool which is used to drive or otherwise force the two telescopically connected members away from each other must be sturdy and capable of imparting significant separating forces to the two members. In the case of the bars which comprise a pair of pivotally connected members, it heretofore has been extremely difficult to design the two members so that they can be adjustably connected to each other in order to accommodate the bar to different joist spacings, and yet also assure that the bar will be secured firmly in place when its two sections are swung into linear alignment with each other.

It is an object of this invention, therefore, to provide an improved hanger bar of the type described, which is a relatively simple and inexpensive to manufacture, and yet which can be readily and securely mounted between a pair of adjacent joists in the ceiling of a room, or the like.

More specifically, it is an object of this invention to provide an improved hanger bar of the pivotally connected variety, which can be readily adjusted to accommodate the bar for a variety of different joist spacings.

Other objects of the invention will be apparent hereinafter from the specification and from the recital of the appended claims, particularly when read in conjunction with the accompanying drawings.

SUMMARY OF THE INVENTION

Two, elongate, channel shaped members are mounted one above the other in overlapping relation, with the side walls of the lower member facing upwardly, and the sidewalls of the upper member, which is slightly narrower than the lower member, facing downwardly and extending between the sidewalls of the lower member. At one end of the bar the two channel shaped members are connected together by a pin and slot connection. At the opposite end of the bar the two members are adjustably connected together by a short link, which is pivotally connected at opposite ends thereof to the two members for swinging movement between a first position in which the upper member is retracted relative to the lower member, and a second position in which the upper member is advanced relative to the lower member, thus extending the overall length of the bar.

In use the bar, with its upper member retracted, is inserted through a hole in a ceiling into the space between a pair of adjacent ceiling joists, and with pointed projections on opposite ends of the bar facing the spaced, confronting surfaces of the two joists. An elongate carriage bolt, which extends at its threaded end downwardly through registering slots in the two members, then has a junction box secured by a nut to its lower end, and against the underside of the lower, channel shaped member. As the nut is tightened, the upper member is drawn downwardly into near linear alignment with the lower member, and simultaneously is advanced by the link longitudinally relative to the lower member, thereby causing the pointed projections on opposite ends of the bar to become imbedded in the adjacent joists.

THE DRAWINGS

FIG. 1 is a side elevational view of an improved hanger bar made according to one embodiment of this invention, one of two channel shaped members of the bar being illustrated in a retracted position as it appears when the bar is not in use, and portions of the bar being broken away and shown in section for purposes of illustration;

FIG. 2 is an enlarged, fragmentary sectional view taken generally along the line 2—2 in FIG. 1 looking in the direction of the arrows;

FIG. 3 is a side elevational view of this bar as it appears when it has been shifted to its operative or expanded position in which it is secured at opposite ends thereof to the confronting surfaces of a pair of spaced ceiling joists which, together with a portion of the associated ceiling, are illustrated fragmentarily and perspectively in FIG. 3;

FIG. 4 is an enlarged, fragmentary sectional view taken generally along the line 4—4 in FIG. 3 looking in the direction of the arrows;

FIG. 5 is a fragmentary plan view of the bar as it appears when it is mounted in an operative position as shown in FIG. 4; and FIGS. 6 and 7 are plan and side elevational views, respectively, of a modified channel shaped member which may be used in the hanger bar of this invention.

DETAILED DESCRIPTION OF THE PREFERRED EMBODIMENTS

Referring now to the drawings by numerals of reference, and first to FIGS. 1 to 5, 10 denotes generally a foldable or collapsible hanger bar comprising a pair of elongate, rigid, channel shaped members 12 and 13 which are pivotally connected together at one end (the right ends thereof as shown in FIGS. 1, 3 and 5) by a rigid link 14. Member 12 has spaced, parallel sidewalls 15 and 16, which face upwardly as shown in the drawings, and which are interconnected along their lower edges by an integral bottom wall 17. Wall 17 of member 12 has therein a plurality of elongate slots 18 which extend centrally and longitudinally of member 12, and only one of which is shown at 18 in FIG. 1.

The upper member 13 is inverted relative to the lower member 12, and has spaced, parallel sidewalls 21 and 22 which are integral along their upper edges with an interconnecting top wall portion 23 of member 13. As shown in FIGS. 1 and 5 the top wall 23 of member 13 also has therein a plurality of elongate slots 24, which extend longitudinally and centrally of member 13 to register with slots 18 in the lower member 12. Also as shown in the drawings, the lower channel member 12 is slightly wider than the upper channel member 13, and therefore its sidewalls 15 and 16 are spaced slightly further apart than the overall width of member 13 so that the latter can be positioned between the sidewalls of member 12 as noted in greater detail hereinafter.

At its end remote from link 14 (left end as shown in FIGS. 1, 3 and 5) the upper wall 23 of member 13 extends slightly beyond the sidewalls 21 and 22 and is shaped to form thereon a plurality of sharp teeth, two of which are denoted at 23' in FIG. 5. Also adjacent the left ends thereof each of the sidewalls 21 and 22 of member 13 has formed therein an elongate slot 26 each of which registers laterally with the other. Mounted adjacent opposite ends thereof in registering, circular openings formed in the sidewalls 15 and 16 of the lower member 12 adjacent its left end (FIGS. 1, 3 and 5) is an elongate pivot pin 31, which extends intermediate its end slidably through the registering slots 26 in the sidewalls 21 and 22 of upper member 13. At one end pin 31 has thereon an enlarged-diameter head 32, which is engaged against the outer surface of the sidewall 15 of the member 12; and at its opposite end pin 31 is secured against removal from member 12 by a cotter pin 33. Pivot pin 32 and the slots 26 thus form a pin and slot connection between the left ends of members 12 and 13.

At its right end (FIGS. 1, 3 and 5) the bottom wall 17 of the lower member 12 projects slightly beyond the adjacent ends of the sidewalls 15 and 16 of member 12, and is machined or otherwise formed into a pair of rather sharp, laterally spaced, toothed shaped projections 17', which are generally similar in configuration to the tooth shaped projections 23' on member 13.

As shown more clearly in FIGS. 3-5, the link 14 is generally U-shaped in configuration, and comprises a pair of spaced, parallel leg sections 41 and 42 which have extending along the upper edges thereof lateral reinforcing flanges 41' and 42', respectively. Adjacent their lower ends the leg sections 41 and 42 are interconnected by an integral, transversely extending base section 43, which is disposed to be positioned beneath member 12. The leg sections 41 and 42 extend upwardly along the outer surfaces of the sidewalls 15 and 16 of member 12, and are pivotally connected to member 12 by an elongate pivot pin 45, opposite ends of which extend through registering, circular openings in the leg sections 41, 42, and the sidewalls 15 and 16 of member 12. As in the case of the pivot pin 31, pin 45 has on one end thereof an enlarged-diameter head 46 which engages against the outer surface of the link leg section 41, and at its opposite end extends slightly beyond the leg section 42 where it is secured against removal by a cotter pin 47 (FIG. 2).

Adjacent their upper ends the link leg sections 41 and 42 are pivotally connected to the right end of the upper member 13 by another pivot pin 51 (FIGS. 4 and 5), opposite ends of which extend through registering, circular openings in the leg sections 41 and 42, and through elongate, registering slots 55 (FIGS. 1 and 3) formed in the sidewalls 21 and 22 of upper member 13 adjacent its right end. Pin 51 has on one end thereof an enlarged-diameter head 52, which seats against the outer surface of the link leg section 41, and projects at its opposite end beyond the outer surface of leg section 42 where it is secured against removabl by a cotter pin 53 (FIG. 4).

The pivot pin 51 is adapted to be adjustably connected to the right end of the upper member 13 by virtue of a plurality of longitudinally spaced notches 55' (three in the embodiment illustrated), which are formed in the upper edges of each of the slots 55 in member 13. The notches 55' in the sidewall 21 of member 13 register laterally, of course, with the corresponding notches 55' in the upper edge of the slot 55 in sidewall 22. With this construction, the pivot pin 55 can be inserted selectively into any one of the three registering pairs of notches formed in the upper edges of slots 55.

When the bar 10 is not in use its members 12 and 13 are retained in their collapsed or inclined positions relative to each other, as shown in FIG. 1, by a wire torsion spring 61 that is wrapped intermediate its ends about the pin 45. At one end 62 thereof spring 61 is seated in member 12 on the upper surface of the bottom wall 17, and at its opposite end it extends as at 63 (FIGS. 1 and 5) beneath the pivot pin 51, whereby spring 61 thus tends to urge the link 14 resiliently clockwise about the axis of pivot pin 45 into its elevated position, as shown in FIG. 1, whereby the upper member 13 normally is retained in a retracted position relative to the lower member 12.

In use, the externally threaded shank of an elongate carriage bolt 71 (FIGS. 3 to 5) is inserted downwardly through registering slots 24 and 18 in the upper and lower members 13 and 12 of bar 10, and with a washer 72 and nut 73 removably mounted on the lower end of bolt 71. This assembly is then inserted through a hole formed in the ceiling C (FIG. 3) of a room and into the space between a pair of adjacent ceiling joists J (FIGS. 3 and 5). With the lower member 12 supported on the upper surface of ceiling C by a pair of spacer blocks S (FIG. 3) or the like, and with the opposite, pointed ends 17' and 23' of the bar 10 facing the confronting surfaces of the two joists J, the upper member 13 is then swung downwardly relative to member 12 toward an operative or expanded position as shown in FIGS. 3 to 5. As member 13 is swung downwardly the pointed ends 17' and 23' of the bar are embedded in the confronting surfaces of the joists J, at which time the two rigid members 12 and 13 will be in near linear, parallel alignment with each other as shown more clearly in FIGS. 3 and 5. During such movement of member 13, the link 14 will swing counterclockwise (FIG. 1) about the axis of pin 45, and in so doing will cause the upper member 13 to be shifted downwardly with translational movement permitted by the pin and slot connection 26, 31 at the left ends of members 12 and 13, and by virtue of the pivotal pin connections between link 14 and members 12 and 13.

In order to permit link 14 to swing downwardly completely into a position in which it becomes substantially parallel to the lower member 12, the upper edges of the sidewalls 15 and 16 of member 12 are provided with registering notches 75 (FIGS. 1 and 5), which are designed to accommodate and to form seats for the pivot pin 51, when the latter is swung from its position as shown in FIG. 1 to the position shown in FIGS. 3 to 5.

When the upper member 13 is swung downwardly toward the lower member 12 in order to fix the bar 10 between the two joists J, the initial downward movement of member 13 relative to member 12 can be effected manually simply by pulling downwardly at the lower end of the carriage bolt 71. However, in order to draw member 13 completely downwardly to its final, expanded position of rest on member 12 (FIG. 3), it is necessary to screw the nut 73 upwardly onto the threaded shank of the carriage bolt 71 until the washer 72 engages the underside of member 12, or alternatively, until washer 72 is seated against the inside surface of a conventional junction box B, which typically is mounted on the underside of the hanger bar 10 when the latter is in use.

Assuming, for example, that the box B is to be secured against the underside of member 12, the closed, upper end of the box B is positioned against the underside of the lower member 12 with the threaded shank of the carriage bolt 71 extending downwardly through a central opening in the box B. The nut 73 is then threaded upwardly on the shank of the carriage bolt 71 to force the washer 72 against the closed end of the box B; and as the nut 73 is threaded tightly against the washer 72, the enlarged-diameter head on the upper end of the carriage bolt 71 draws the upper member 13 downwardly and firmly against the lower member 12, and in so doing causes the pointed ends 17' and 23' of the hanger bar 10 to become securely embedded in the spaced joists J. When the junction box B is securely fixed to the hanger bar 10, a ceiling fixture can then be secured to the box B and/or to the hanger 10 itself, in any conventional manner.

From the foregoing it will be apparent that the present invention provides a relatively simple and inexpensive means for providing a sturdy ceiling fixture support, which extends transversely between any selected pair of ceiling joists. It will be apparent that slight differences in the space between adjacent joists can be compensated by virtue of the plurality of notches 55' formed in the slots 55 in the upper member 13. The extent to which the member 13 will be extended relative to member 12, when the bar is placed in use, will depend upon which of the three sets of notches 55' in which the pin 51 is seated. Also, by use of the wire torsion spring 61, it is unnecessary for an operator to maintain the parts in any particular position during installation, since the spring 61 will tend to retain members 12 and 13 in their collapsed positions relative to each other, and till such time that bar 10 is placed in use. Spring 11 permits manual extension of member 13 relative to member 12 simply by drawing downwardly on the carriage bolt 71, the final embedment of the pointed ends 17' and 23' of the bar being effected by threading the nut 73 upwardly on the carriage bolt 71 sufficiently to cause member 13 to be drawn downwardly relative to member 12 to its final or fully extended position.

Referring now to FIGS. 6 and 7, the numeral 83 denotes a modified form of channel member or bar which can be used in producing a bar 10. Member 83 is generally similar to member 13, except that it is substantially longer than member 13, and has therein two spaced sets of adjusting slots 85 in each side wall 81 and 82 thereof rather than a single set such as 55. In addition to the registering slots 86 for the pin and slot connection (similar to slots 26) it includes in its sidewalls three spaced sets of registering, circular openings 87, 88 and 89. In its upper wall member 83 has therein longitudinally extending, centrally disposed slots 84, and at one end thereof (left end in FIGS. 6 and 7) it has formed thereon the spaced teeth 83'.

The member 83 is produced in two different widths one of which is slightly narrower than the other, whereby the wider of the two may be used in a bar 10 as the lower member (12) and the narrower member 83 as the upper member (13) of the bar. When used in place of member 12 of bar 10, member 83 would be reversed from the position as shown in FIG. 7, and its sidewalls would face upwardly. The openings 87 would then be used to connect the lower member 83 to the lower end of link 14, and openings 89 would be used to accommodate pivot pin 31. The upper end of link 14 would be connected by pin 51 to the slots 85 shown at the right end of the bar 83 as shown in FIG. 7.

One of the advantages of a bar manufactured from a pair of channel members 83 is that the overall length of the bar can be shortened from a size suitable, for example, for mounting in a twnety four inch span between joists, to a sixteen inch span. This is done by cutting each bar 83 of a pair along a line denoted at A in FIGS. 6 and 7, before connected the two members together by a link 14. The shortened bars then use openings 88 and adjacent slots 85 for mounting purposes.

While this invention has been illustrated and described in connection with only certain embodiments thereof, it will be apparent that it is capable of still further modification, and that this application is intended to cover any such modifications as may fall within the scope of one skilled in the art, or the appended claims.

I claim:

1. A ceiling fixture hanger bar disposed to be removably mounted between a pair of spaced ceiling joists, and comprising
   first and second elongate, rigid members each having an inner end and an outer end, respectively,
   means mounting said first member for limited pivotal and translational movement relative to said second member between a retracted position in which said first member is inclined at an angle to said second member, and an advanced position in which said members extend substantially parallel to each other, and have the inner ends thereof positioned in overlapping relation, and
   means on the outer ends of said members disposed to be placed in gripping engagement with the confronting surfaces of a pair of spaced ceiling joists, when said members are positioned to extend transversely between said joists and said first member is moved to its advanced position,
   said mounting means including means forming a pin and slot connection between the outer end of one of said members and the inner end of the other of said members,
   a link pivotally connected adjacent one end thereof to said one member adjacent said inner end thereof, and adjacent its opposite end to said other member adjacent said outer end thereof, and
   resilient means interposed between said members and operative normally to retain said first member in its retracted position.

2. A ceiling fixture hanger bar as defined in claim 1, wherein said link is pivotal between a first limit position in which it is inclined to both said members, when said first member is in its retracted position, and a second limit position in which said link is in substantially parallel alignment with said members, when said first member is in its advanced position.

3. A ceiling fixture hanger bar as defined in claim 2, including,
   means adjustably connecting said link to said members,
   said link being operative, upon movement thereof from its first to its second limit position, to effect movement of said first member to its advanced position, and
   said connecting means being adjustable selectively to increase or decrease the extent to which said first member can be advanced relative to said second member.

4. A ceiling fixture hanger bar as defined in claim 1, including
   a pair of spaced parallel pivot pins carried in said link adjacent opposite ends thereof, and pivotally connected to said first and said second members, respectively,
   one of said pins being removably fixed to said second member adjacent said outer end thereof, and
   the other of said pins being adjustably connected to said inner end of said first member for swinging movement therewith about the axis of said one pin upon movement of said link between its first and second limit positions.

5. A ceiling fixture hanger bar as defined in claim 4, wherein
   said other pin extends intermediate its ends through an elongate slot formed in said first member to extend longitudinally thereof,
   said elongate slot has a plurality of longitudinally spaced recesses in one edge thereof, and
   said other pin is adjustable selectively to be seated in any one of said recesses during pivotal movement of said link, thereby selectively to adjust the extent to which said first member is advanced relative to said second member.

6. A ceiling fixture hanger bar as defined in claim 1, including means interposed between said members and operable to draw said first member into its advanced position against the resistance of said resilient means.

7. A ceiling fixture hanger bar disposed to be mounted in the space between a pair of adjacent ceiling joists to extend transversely therebetween, and comprising
   first and second members each having an inner end and an outer end, respectively,
   means forming a pin and slot connection between the outer end of said first member and the inner end of said second member,
   a third member pivotally connected adjacent opposite ends thereof, respectively, to the inner end of said first member and the outer end of said second member,
   said third member being pivotal between a first limit position in which it moves the inner end of said first member away from the outer end of said second member, whereby all three of said members are inclined to each other, and a second position in which it moves said inner end of said first member into engagement with said second member, whereby said three members are disposed substantially parallel to each other,
   said third member and said pin and slot connection operatively supporting said first member for limited pivotal and translational movement between retracted and advanced positions, respectively, relative to said second member, and
   gripping means on said outer ends of said first and second members fixedly engagable with the confronting surfaces of a pair of spaced ceiling joists, when said members are positioned to extend transversely between said joists, and said first member is moved to its advanced position relative to said second member.

8. A ceiling fixture hanger bar as defined in claim 7, including hanger bar expansion means interposed between two of said members and operable positively to draw said two members toward each other, thereby to cause said first member to be moved to said advanced position thereof.

9. A ceiling fixture hanger bar as defined in claim 7, including
   means adjustably connecting said third member adjacent one end thereof to one of said first and second members, respectively, for pivotal movement about an axis adjustable longitudinally of said one member selectively into one of several different positions.

10. A ceiling fixture hanger bar as defined in claim 7, including resilient means interposed between two of said members normally to retain said first member in its retracted position.

11. An elongate, rigid member for use in a ceiling fixture hanger bar, said member being generally U-shaped in cross section, and comprising
- an elongate, planar bottom wall having integral, spaced, parallel side walls projecting upwardly therefrom, and having therethrough a plurality of longitudinally extending slots,
- at least one sharp point formed on one end of said bottom wall,
- three longitudinally spaced sets of registering, circular openings formed in the sidewalls of said member, and
- three longitudinally spaced sets of registering slots formed in the sidewalls of said member, said slots extending longitudinally of said sidewalls, and one longitudinal edge of each of the slots of two sets thereof having a plurality of longitudinally circular recesses formed therein.

* * * * *